(12) United States Patent
Henning et al.

(10) Patent No.: US 6,566,478 B1
(45) Date of Patent: May 20, 2003

(54) SYNTHESIS OF HIGH VINYL RUBBER

(75) Inventors: Steven Kristofer Henning, Hudson, OH (US); Michael Lester Kerns, Medina, OH (US); Zhengfang Xu, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/135,138

(22) Filed: Apr. 30, 2002

(51) Int. Cl.$^7$ ............................. C08F 36/04; C08F 4/48
(52) U.S. Cl. ...................... 526/335; 526/174; 526/175; 526/180; 526/181; 526/340; 526/340.2; 524/571; 524/575; 502/154; 502/155; 502/156; 502/157
(58) Field of Search ................... 526/174, 175, 526/335, 340, 340.2, 180, 181; 524/571, 575; 502/154, 156, 157, 155

(56) References Cited

U.S. PATENT DOCUMENTS

| | | | |
|---|---|---|---|
| 3,496,154 A | * 2/1970 | Wofford | 526/175 X |
| 3,736,312 A | * 5/1973 | Halasa | 526/175 |
| 4,843,120 A | 6/1989 | Halasa et al. | 525/53 |
| 5,047,483 A | 9/1991 | Halasa et al. | 525/237 |
| 5,061,765 A | 10/1991 | Hsu et al. | 526/141 |
| 5,137,998 A | 8/1992 | Hsu et al. | 526/174 |
| 5,239,009 A | 8/1993 | Halasa et al. | 525/258 |
| 5,272,220 A | 12/1993 | Rodgers et al. | 525/332.3 |
| 5,405,927 A | 4/1995 | Hsu et al. | 526/337 |
| 5,620,939 A | 4/1997 | Halasa et al. | 502/154 |
| 5,627,237 A | 5/1997 | Halasa et al. | 525/236 |
| 5,654,384 A | 8/1997 | Halasa et al. | 526/174 |
| 6,140,434 A | 10/2000 | Halasa et al. | 526/174 |

* cited by examiner

Primary Examiner—Fred Teskin
(74) Attorney, Agent, or Firm—Alvin T. Rockhill (57) ABSTRACT

This invention is based upon the discovery that rubbery polymers having a high vinyl content and a low degree of branching can be synthesized with an initiator system that is comprised of (a) a lithium initiator selected from the group consisting of allylic lithium compounds and benzylic lithium compounds, (b) a Group I metal alkoxide, and (c) a polar modifier; wherein the molar ratio of the Group I metal alkoxide to the polar modifier is within the range of about 0.1:1 to about 10:1; and wherein the molar ratio of the Group I metal alkoxide to the lithium initiator is within the range of about 0.01:1 to about 20:1. These high vinyl polymers offer reduced levels of hysteresis and better functionalization efficiency. By virtue of their lower level of hysteresis these polymers can be utilized in manufacturing tire tread compounds that exhibit lower levels of rolling resistance and can accordingly be used to improve the fuel economy of motor vehicles without compromising other desirable characteristics, such as traction and tread-wear.

39 Claims, 4 Drawing Sheets

The molecular weight distributions for the base polymer and the final polymer

The amount of additional monomer added after the metallation step that was grafted on the base polymer chains under different initiator systems: (a) TMEDA/Li=3.0/1.0; (b) SMT/Li=0.1/1.0; and (c) TMEDA/SMT/Li=3.0/0.1/1.0

The amount of additional monomer added after the metallation step that was grafted on the base polymer chains under different metallation temperatures

FIG-3

Root Mean Square (RMS) radius vs. molecular weight

FIG-4

Shear Moduli vs. frequency for Polymers a and b

FIG-5

Tan Δ vs. frequency for polymers a and b

FIG-6

SYNTHESIS OF HIGH VINYL RUBBER

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor which determines the life of the tire.

The traction, tread wear, and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance various mixtures of styrene-butadiene rubber and polybutadiene rubber are commonly used as a rubber material for automobile tire treads. However, such blends are not totally satisfactory for all purposes.

The inclusion of styrene-butadiene rubber (SBR) in tire tread formulations can significantly improve the traction characteristics of tires made therewith. However, styrene is a relatively expensive monomer and the inclusion of SBR is tire tread formulations leads to increased costs.

Carbon black is generally included in rubber compositions that are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved. Silica can also be included in tire tread formulations to improve rolling resistance.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

U.S. Pat. No. 5,239,009 reveals a process for preparing a rubbery polymer which comprises: (a) polymerizing a conjugated diene monomer with a lithium initiator in the substantial absence of polar modifiers at a temperature which is within the range of about 5° C. to about 100° C. to produce a living polydiene segment having a number average molecular weight which is within the range of about 25,000 to about 350,000; and (b) utilizing the living polydiene segment to initiate the terpolymerization of 1,3-butadiene, isoprene, and styrene, wherein the terpolymerization is conducted in the presence of at least one polar modifier at a temperature which is within the range of about 5° C. to about 70° C. to produce a final segment which is comprised of repeat units which are derived from 1,3-butadiene, isoprene, and styrene, wherein the final segment has a number average molecular weight which is within the range of about 25,000 to about 350,000. The rubbery polymer made by this process is reported to be useful for improving the wet skid resistance and traction characteristics of tires without sacrificing tread wear or rolling resistance.

U.S. Pat. No. 5,061,765 discloses isoprene-butadiene copolymers having high vinyl contents which can reportedly be employed in building tires which have improved traction, rolling resistance, and abrasion resistance. These high vinyl isoprene-butadiene rubbers are synthesized by copolymerizing 1,3-butadiene monomer and isoprene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and herein the molar ratio of the protonic compound to the organoaluminum compound is within the range of about 0.001:1 to about 0.2:1.

U.S. Pat. No. 5,405,927 discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., and wherein the rubber has a Mooney viscosity which is within the range of about 55 to about 140.

U.S. Pat. No. 5,654,384 discloses a process for preparing high vinyl polybutadiene rubber which comprises polymerizing 1,3-butadiene monomer with a lithium initiator at a temperature which is within the range of about 5° C. to about 100° C. in the presence of a sodium alkoxide and a polar modifier, wherein the molar ratio of the sodium alkoxide to the polar modifier is within the range of about 0.1:1 to about 10:1; and wherein the molar ratio of the sodium alkoxide to the lithium initiator is within the range of about 0.05:1 to about 10:1. By utilizing a combination of sodium alkoxide and a conventional polar modifier, such as an amine or an ether, the rate of polymeriztion initiated with organolithium compounds can be greatly increased with the glass transition temperature of the polymer produced also being substantially increased. The rubbers synthesized using such catalyst systems also exhibit excellent traction properties when compounded into tire tread formulations. This is attributable to the unique macrostructure (random branching) of the rubbers made with such catalyst systems.

U.S. Pat. Nos. 5,620,939, 5,627,237, and U.S. Pat. No. 5,677,402 also disclose the use of sodium salts of saturated aliphatic alcohols as modifiers for lithium initiated solution polymerizations. Sodium t-amylate is a preferred sodium alkoxide by virtue of its exceptional solubility in non-polar aliphatic hydrocarbon solvents, such as hexane, which are employed as the medium for such solution polymerizations. However, using sodium t-amylate as the polymerization modifier in commercial operations where recycle is required can lead to certain problems. These problems arise due to the fact that sodium t-amylate reacts with water to form t-amyl alcohol during steam stripping in the polymer finishing step. Since t-amyl alcohol forms an azeotrope with hexane, it co-distills with hexane and thus contaminates the feed stream.

U.S. Pat. No. 6,140,434 discloses a solution to the problem of recycle stream contamination. U.S. Pat. No. 6,140,434 is based in upon the discovery that metal salts of cyclic alcohols are highly effective modifiers that do not co-distill with hexane or form compounds during steam stripping which co-distill with hexane. Since the boiling points of these metal salts of cyclic alcohols are very high, they do not co-distill with hexane and contaminate recycle streams. Additionally, metal salts of cyclic alcohols are considered to be environmentally safe. In fact, sodium mentholate is used as a food additive.

U.S. Pat. No. 6,140,434 specifically discloses a process for preparing a rubbery polymer having a high vinyl content which comprises: polymerizing at least one diene monomer with a lithium initiator at a temperature which is within the range of about 5° C. to about 100° C. in the presence of a metal salt of a cyclic alcohol and a polar modifier, wherein the molar ratio of the metal salt of the cyclic alcohol to the polar modifier is within the range of about 0.1:1 to about 10:1; and wherein the molar ratio of the metal salt of the cyclic alcohol to the lithium initiator is within the range of about 0.05:1 to about 10:1.

SUMMARY OF THE INVENTION

The present invention is based upon the discovery that rubbery polymers having a high vinyl content and a low degree of branching can be synthesized with an initiator system that is comprised of (a) a lithium initiator selected from the group consisting of allylic lithium compounds and benzylic lithium compounds, (b) a Group I metal alkoxide, and (c) a polar modifier; wherein the molar ratio of the Group I metal alkoxide to the polar modifier is within the range of about 0.1:1 to about 10:1; and wherein the molar ratio of the Group I metal alkoxide to the lithium initiator is within the range of about 0.01:1 to about 20:1. The key to the present invention is the use of an allylic lithium compound or a benzylic lithium compound in the initiator system.

These high vinyl polymers offer reduced levels of hysteresis and better functionalization efficiency. By virtue of their lower level of hysteresis these polymers can be utilized in manufacturing tire tread compounds that exhibit lower levels of rolling resistance and can accordingly be used to improve the fuel economy of motor vehicles without compromising other desirable characteristics, such as traction and tread-wear.

The subject invention further discloses a process for preparing a rubbery polymer having a high vinyl content which comprises: polymerizing at least one diene monomer with a lithium initiator selected from the group consisting of allylic lithium compounds and benzylic lithium compounds at a temperature which is within the range of about 5° C. to about 120° C. in the presence of a Group I metal alkoxide and a polar modifier, wherein the molar ratio of the Group I metal alkoxide to the polar modifier is within the range of about 0.1:1 to about 10:1; and wherein the molar ratio of the Group I metal alkoxide to the lithium initiator is within the range of about 0.05:1 to about 10:1.

The present invention also reveals a process for preparing high vinyl polybutadiene rubber which comprises: polymerizing 1,3-butadiene monomer with a lithium initiator selected from the group consisting of allylic lithium compounds and benzylic lithium compounds at a temperature which is within the range of about 5° C. to about 120° C. in the presence of Group I metal alkoxide and a polar modifier, wherein the molar ratio of the Group I metal alkoxide to the polar modifier is within the range of about 0.1:1 to about 10:1; and wherein the molar ratio of the Group I metal alkoxide to the lithium initiator is within the range of about 0.05:1 to about 10:1.

The subject invention further discloses a high vinyl polydiene rubber which is comprised of at least 50 percent repeat units that are of vinyl microstructure based upon the total number of polydiene repeat units in the rubbery polymer, wherein said high vinyl polybutadiene rubber has a weight average molecular weight of at least 300,000, wherein said high vinyl polybutadiene rubber has a monomodal polydispersity of at least 1.2, and a ratio of radius of gyration to weight average molecular weight of greater than 0.078 nm·mol/kg, wherein the radius of gyration is determined at the weight average molecular weight by multi angle laser light scattering and wherein the weight average molecular weight is determined by multi angle laser light scattering.

DETAILED DESCRIPTION OF THE INVENTION

The rubbery polymers synthesized using the initiator systems of this invention can be made by the homopolymerization of a conjugated diolefin monomer or by the copolymerization of a conjugated diolefin monomer with a vinyl aromatic monomer. It is, of course, also possible to make rubbery polymers by polymerizing a mixture of conjugated diolefin monomers with one or more ethylenically unsaturated monomers, such as vinyl aromatic monomers. The conjugated diolefin monomers which can be utilized in the synthesis of rubbery polymers in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be copolymerized into rubbery polymers using the modifiers of this invention include alkyl acrylates, such as methyl acrylate, ethyl acrylate, butyl acrylate, methyl methacrylate and the like; vinylidene monomers having one or more terminal CH2=CH— groups; vinyl aromatics such as styrene, á-methylstyrene, bromostyrene, chlorostyrene, fluorostyrene and the like; á-olefins such as ethylene, propylene, 1-butene and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; á,â-olefinically unsaturated nitriles, such as acrylonitrile and methacrylonitrile; á,â-olefinically unsaturated amides, such as acrylamide, N-methylacrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications. The level of the vinylaromatic monomer is such copolymers with more typically be within the range of about 5 weight percent to about 40 weight percent and will more typically be within the range of about 15 weight percent to about 35 weight percent.

Vinyl aromatic monomers are probably the most important group of ethylenically unsaturated monomers that are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, á-methylstyrene, 4-phenylstyrene, 3-methylstyrene and the like.

Some representative examples of rubbery polymers which can be asymmetrically tin-coupled in accordance with this invention include polybutadiene, polyisoprene, styrene-butadiene rubber (SBR), á-methylstyrene-butadiene rubber, á-methylstyrene-isoprene rubber, styrene-isoprene-butadiene rubber (SIBR), styrene-isoprene rubber (SIR), isoprene-butadiene rubber (IBR), á-methylstyrene-isoprene-butadiene rubber and á-methylstyrene-styrene-isoprene-butadiene rubber.

The polymerizations of this invention are normally carried out as solution polymerizations in an inert organic medium. However, the initiator systems of this invention can also be utilized in bulk polymerizations or vapor phase polymerizations. In any case, the vinyl content of the rubbery polymer made is controlled by the amount of modifier present during the polymerization.

In solution polymerizations the inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The allylic lithium compounds that can be used are typically made by reacting an alkyl lithium compound with a conjugated diolefin monomer. The conjugated diolefin monomer will typically be 1,3-butadiene or isoprene. The benzylic lithium compounds that can be used are typically made by reacting an alkyl lithium compound with a vinyl aromatic monomer, such as styrene or alpha-methyl styrene. The alkyl lithium compounds that can be used in making the allylic lithium or benzylic lithium compound can be represented by the formula: R—Li, wherein R represents a hydrocarbyl radical containing from 1 to about 20 carbon atoms. Some representative examples of alkyllithium compounds which can be employed include methyllithium, ethyllithium, isopropyllithium, n-butyllithium, sec-butyllithium, n-octyllithium, tert-octyllithium, n-decyllithium. Aryl lithium compounds, such as, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium, can also be used. Some representative examples of preferred alkyllithium compounds that can be utilized include ethylaluminum, isopropylaluminum, n-butyllithium, secondary-butyllithium, and normal-hexyllithium. Normal-butyllithium and secondary-butyllithium are highly preferred lithium initiators.

The allylic lithium compound or the benzylic lithium compound can be made by continuously adding the conjugated diolefin monomer or the vinyl aromatic monomer to a line containing a solution of the alkyl lithium compound. In such cases, the line will typically flow into the reactor to initiate polymerization. In the alternative, the allylic lithium compound or the benzylic lithium compound can be made by a batch process wherein the conjugated diolefin monomer or vinyl aromatic monomer is added into a solution containing the alkyl lithium compound. In either case, the molar ratio of the alkyl lithium compound to the conjugated diolefin monomer or vinyl aromatic monomer will be within the range of 1:1 to 1:50. The molar ratio of the alkyl lithium compound to the conjugated diolefin monomer or vinyl aromatic monomer will preferably be within the range of 1:2 to 1:25. The molar ratio of the alkyl lithium compound to the conjugated diolefin monomer or vinyl aromatic monomer will more preferably be within the range of 1:5 to 1:10.

The amount of lithium initiator utilized in the initiator systems of this invention will vary with the specific allylic lithium or benzylic lithium compound empolyed and with the molecular weight that is desired for the rubber being synthesized. As a general rule in all anionic polymerizations, the molecular weight (Mooney viscosity) of the polymer produced is inversely proportional to the amount of lithium utilized. As a general rule, from about 0.01 phm (parts per hundred parts by weight of monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst.

Normally, from about 5 weight percent to about 35 weight percent of the monomer will be charged into the polymerization medium (based upon the total weight of the polymerization medium including the organic solvent and monomer). In most cases, it will be preferred for the polymerization medium to contain from about 10 weight percent to about 30 weight percent monomer. It is typically more preferred for the polymerization medium to contain from about 20 weight percent to about 25 weight percent monomer.

The polymerization temperature will normally be within the range of about 5° C. to about 120° C. For practical reasons and to attain the desired microstructure the polymerization temperature will preferably be within the range of about 20° C. to about 80° C. Polymerization temperatures within the range of about 40° C. to about 70° C. are more preferred with polymerization temperatures within the range of about 55° C. to about 65° C. being the very most preferred.

The polymerization is allowed to continue until essentially all of the monomer has been exhausted. In other words, the polymerization is allowed to run to completion. Since a lithium catalyst is employed to polymerize the monomer, a living polymer is produced. The living polymer synthesized will have a weight average molecular weight of at least 300,000. The high vinyl polymer synthesized will typically have a weight average molecular weight that is within the range of about 350,000 to about 2,000,000. The rubber synthesized will more typically have a weight average molecular weight that is within the range of about 400,000 to about 1,000,000.

To increase the level of vinyl content the polymerization is carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene, and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and U.S. Pat. No. 4,696,986 are incorporated herein by reference in their entirety. The microstructure of the repeat units which are derived from butadiene monomer is a function of the polymerization temperature and the amount of polar modifier present. For example, it is known that higher temperatures result in lower vinyl contents (lower levels of 1,2-microstructure). Accordingly, the polymerization temperature, quantity of modifier and specific modifier selected will be determined with the ultimate desired microstructure of the polybutadiene rubber being synthesized being kept in mind.

The Group I metal alkoxides that is used in the initiator system of this invention will typically contain a Group I metal selected from the group consisting of lithium, sodium, potassium, rubidium, and cesium. The Group I metal alkoxide can be a compound of the formula M—O—R, wherein M represents the Group I metal and wherein R represents an alkyl group containing from 1 to about 20 carbon atoms. U.S. Pat. No. 5,654,384 and U.S. Pat. No. 5,906,956 disclose a number of sodium alkoxide compounds that can be used in the practice of this invention. The teaching of U.S. Pat. No. 5,654,384 and U.S. Pat. No. 5,906,956 are incorporated herein by reference with respect to the types of sodium alkoxide compounds that can be used.

The Group I metal alkoxide will preferably be a metal salt of the cyclic alcohol. Lithium, sodium, potassium, rubidium, and cesium salts are representative examples of such salts with lithium, sodium, and potassium salts being preferred. Sodium salts are typically the most preferred. The cyclic alcohol can be mono-cyclic, bi-cyclic or tri-cyclic and can be aliphatic or aromatic. They can be substituted with 1 to 5 hydrocarbon moieties and can also optionally contain hetero-atoms. For instance, the metal salt of the cyclic alcohol can be a metal salt of a di-alkylated cyclohexanol, such as 2-isopropyl-5-methylcyclohexanol or 2-t-butyl-5-methylcyclohexanol. These salts are preferred because they are soluble in hexane. Metal salts of disubstituted cyclohexanol are highly preferred because they are soluble in hexane and provide similar modification efficiencies to sodium t-amylate. Sodium mentholate is the most highly preferred metal salt of a cyclic alcohol that can be empolyed in the practice of this invention. Metal salts of thymol can also be utilized. The metal salt of the cyclic alcohol can be prepared by reacting the cyclic alcohol directly with the metal or another metal source, such as sodium hydride, in an aliphatic or aromatic solvent.

The Group I metal alkoxide to the polar modifier will normally be within the range of about 0.1:1 to about 10:1 and the molar ratio of Group I metal alkoxide to the lithium initiator will normally be within the range of about 0.01:1 to about 20:1. It is generally preferred for the molar ratio of the Group I metal alkoxide to the polar modifier to be within the range of about 0.2:1 to about 5:1 and for the molar ratio of the Group I alkoxide to the lithium initiator to be within the range of about 0.05:1 to about 10:1. It is generally more preferred for the molar ratio of the Group I metal alkoxide to the polar modifier to be within the range of about 0.5:1 to about 1:1 and for the molar ratio of the Group I metal alkoxide to the lithium initiator to be within the range of about 0.2:1 to about 3:1.

After the polymerization has been completed, the living rubbery polymer can optionally be coupled with a suitable coupling agent, such as a tin tetrahalide or a silicon tetrahalide. The rubbery polymer is then recovered from the organic solvent. The polydiene rubber can be recovered from the organic solvent and residue by any means, such as decantation, filtration, centrification and the like. It is often desirable to precipitate the rubbery polymer from the organic solvent by the addition of lower alcohols containing from about 1 to about 4 carbon atoms to the polymer solution. Suitable lower alcohols for precipitation of the rubbery polymer from the polymer cement include methanol, ethanol, isopropyl alcohol, normal-propyl alcohol and t-butyl alcohol. The utilization of lower alcohols to precipitate the rubber from the polymer cement also "kills" the living polymer by inactivating lithium end groups. After the rubbery polymer is recovered from the solution, steam stripping can be employed to reduce the level of volatile organic compounds in the polymer. The inert solvent and residual monomer can then be recycled for subsequent polymerization.

There are valuable benefits associated with utilizing the high vinyl polydiene rubbers made with the initiator systems of this invention in tire tread compounds. These benefits include excellent traction characteristics, low hysteresis and better functionalization effeciency. The high vinyl polydiene rubber will have at least 50 percent repeat units that are of vinyl microstructure based upon the total number of polydiene repeat units in the rubbery polymer. The high vinyl polybutadiene rubber has a weight average molecular weight of at least 300,000, wherein said high vinyl polybutadiene rubber has a monomodal polydispersity of at least 1.2, and a ratio of radius of gyration to weight average molecular weight of greater than 0.078 nm·mol/kg , wherein the radius of gyration is determined at the weight average molecular weight by multi angle laser light scattering and wherein the weight average molecular weight is determined by multi angle laser light scattering.

The high vinyl polydiene rubber will preferably have a vinyl content of at least 55 percent and a monomodal polydispersity of at least 1.4. The high vinyl polydiene rubber will also preferable have a ratio of radius of gyration to weight average molecular weight of greater than 0.08 nm·mol/kg. The high vinyl polydiene rubber will more preferable have a ratio of radius of gyration to weight average molecular weight of greater than 0.082 nm·mol/kg.

It is, of course, possible to blend the high vinyl rubber with other rubbery polymers, such as natural rubber, synthetic polyisoprene rubber, cis-1,4-polybutadiene rubber, medium vinyl polybutadiene rubber, conventional solution styrene-butadiene rubber, emulsion styrene-butadiene rubber, or conventional styrene-isoprene-butadiene rubber, in making useful tire tread compounds.

The high vinyl polydiene rubber can be compounded utilizing conventional ingredients and standard techniques. For instance, the polybutadiene rubber blends will typically be mixed with carbon black and/or silica, sulfur, fillers, accelerators, oils, waxes, scorch inhibiting agents, and processing aids. In most cases, the high vinyl polydiene rubber blend will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being referred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The polybutadiene blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

In cases where silica is included in the tread rubber compound, the processing of the polydiene rubber blend is normally conducted in the presence of a sulfur containing organosilicon compound to realize maximum benefits. Examples of suitable sulfur containing organosilicon compounds are of the formula:

$$Z\text{-Alk-}S_n\text{-Alk-}Z \qquad (I)$$

in which Z is selected from the group consisting of where $R^1$ is an alkyl group of 1 to 4 carbon atoms, cyclohexyl or phenyl; wherein $R^2$ is alkoxy of 1 to 8 carbon atoms, or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxysilylpropyltetrasulfide, 2,2'-bis(dimethylmethoxysilylethyl)disulfide, 2,2'-bis(dimethylsec.butoxysilylethyl)trisulfide, 3,3'-bis(methylbutylethoxysilylpropyl)tetrasulfide, 3,3'-bis(di t-butylmethoxysilylpropyl)tetrasulfide, 2,2'-bis(phenylmethylmethoxysilylethyl)trisulfide, 3,3'-bis(diphenylisopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyldisec.butoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3-phenylethoxybutoxysilyl 3'-trimethoxysilylpropyltetrasulfide, 4,4'-bis(trimethoxysilylbutyl)tetrasulfide, 6,6'-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxysilylpropyl)sulfides. The most preferred compound is 3,3'-bis(triethoxysilylpropyl)tetrasulfide. Therefore as to formula I, preferably Z is where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of formula I in a rubber composition will vary depending on the level of silica that is used. Generally speaking, the amount of the compound of formula I will range from about 0.01 to about 1.0 parts by weight per part by weight of the silica. Preferably, the amount will range from about 0.02 to about 0.4 parts by weight per part by weight of the silica. More preferably the amount of the compound of formula I will range from about 0.05 to about 0.25 parts by weight per part by weight of the silica.

In addition to the sulfur containing organosilicon, the rubber composition should contain a sufficient amount of silica, and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica. For instance the silica can include pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s)than the preceding non-productive mix stage(s). The rubber, silica and sulfur containing organosilicon, and carbon black if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

Tire tread compounds made using such high vinyl polydiene rubber blends can be used in tire treads in conjunction with ordinary tire manufacturing techniques. Tires are built utilizing standard procedures with the high vinyl polydiene rubber blend simply being substituted for the rubber compounds typically used as the tread rubber. After the tire has been built with the high vinyl polydiene rubber containing blend, it can be vulcanized using a normal tire cure cycle. Tires made in accordance with this invention can be cured over a wide temperature range. However, it is generally preferred for the tires to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires to have a duration of about 10 to about 20 minutes with a cure cycle of about 12 to about 18 minutes being most preferred.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLES

Materials and Methods

Materials.

Butadiene and styrene were supplied by The Goodyear Tire & Rubber Company, and was freshly distilled and degassed with nitrogen prior to use. Hexane was supplied by Ashland Chemicals and purified by passing over an activated bed of silica gel under a dry nitrogen atmosphere. N-butyllithium (n-BuLi) was supplied by Chemetall Inc. and was used as received. TMEDA was purchased from Aldrich and was used as received. SMT was supplied by The Goodyear Tire & Rubber Company.

Polymerizations

Batch polymerizations were conducted in a 3.8 liter reactor. The reactor was equipped with a variable speed agitator and a heating/cooling coil to control the reactor temperature via a distributed Foxboro control system. A representative procedure for conducting a polymerization was to first fill the reactor with hexane and pickle with 1.5 ml of 1.6M n-BuLi solution at 65° C. The pickled hexane was then dumped from the reactor and the reactor was blown down with dry nitrogen for two minutes to purge any residual liquid. Approximately 1500 grams of 15 weight percent styrene-butadiene (25/75 weight percent) solution in hexanes was charged into the reactor. The reactor temperature was then brought to its set point of 65° C., and a predetermined amount of modifier and n-BuLi was charged into the reactor using a syringe via the injection port on the reactor. The reaction then commenced and samples of the reaction mixture were taken via a dipleg during the course of polymerization for residual monomer analysis utilizing gas chromatography (GC). The GC results were used to calculate monomer conversions in order to determine whether monomers reach their full conversions.
Characterization.

Size-exclusion chromatography (SEC) was performed using a Wyatt Technologies miniDawn light scattering detector coupled with a Hewlett Packard 1047A refractive index detector. Polymer Laboratories B, C, and D mixed microgel columns were utilized with tetrahydrofuran as the carrier solvent at a flow rate of 0.35 ml/min and a column temperature of 40° C. Sample preparation involved filtering a 0.12 weight percent solution of polymer in THF through a 1.0 μm filter prior to injection. Polystyrene standards were used to calibrate the instrument.

Results and Discussion

The initiation in anionic polymerization is always assumed to be a faster step compared to propagation, and the initiator n-BuLi was immediately consumed. Instant initiation may be assumed in batch polymerization and in plug flow reactor processes. In a continuous process, the reactants and products constantly flow into and out of the reactor. Theoretically, every species exists in the reactor at any given time due to the reactor residence time distribution. Therefore, in a typical butadiene-styrene copolymerization system, three reactive species, i.e. two propagating species of allylic lithium (butadienyllithium) and benzylic lithium (styryllithium) and initiator n-BuLi may be present. In the presence of polar modifiers, these three reactive species may exhibit different metallation strengths. It is thus important to distinguish their individual metallation strength for any process improvement aimed at reducing the polymer branching.

A. Preparation of Butadienyllithium and Styryllithium

To isolate the effects of different reactive species, butadienyllithium (allylic lithium) and styryllithium (benzylic lithium) species have to be prepared. Preformed butadienyllithium was prepared through the reaction of butadiene and n-butyllithium. In a 4-oz oven-dried nitrogen purged bottle, 50 grams of 15 weight percent butadiene solution in hexanes was charged into the bottle. Using a syringe, 17.4 ml of 1.6M n-BuLi was added into the bottle to pre-form an allylic lithium initiator with the molar ratio of butadiene to n-BuLi being 5:1. The bottle was placed in 65° C. water bath and tumbled for 30 minutes.

Styryllithium cannot be prepared directly through the reaction of n-butyllithium and styrene in hexane because oligomer of styrene will precipitate from the hexane solution. A two-step procedure was thus designed in this study to form a soluble styryllithium. First butadiene oligomers were prepared by reacting butadiene with n-butyllithium as described in the preparation of butadienyllithium. After the living butadienyl oligomer was preformed, a test polymerization was conducted to check the active concentration of butadienyllithium. Based upon the GPC result and the amount of butadiene from the test polymerization, the active concentration was determined. A soluble form of benzylic lithium was then formed by adding 2 molar equivalents of styrene to the living butadienyl oligomers.

B. Metallation Method

Anionic systems using heavy alkali metal alkoxides have been a research topic for many years. The majority of studies were designed to identify the resulting metallating species and to understand the operating mechanism, while polymerization was neglected (see Modrini, A., Adv. Carbanion Chem., 1992, 1, 1; Lochmann, L.; Trekoval, J. Collect. Czech. Chem. Comm., 1988, 15, 585; Lochmann, L.; Lim, D., J. Organomet. Chem., 1971, 28, 153; and Pi, R.; Bauer, B.; Schade, C.; Schleyer, P. v. R., J. Organomet. Chem., 1986, 306, C1). In practice, the polymerization system is complicated by many factors such as counter-cations and the addition of polar modifiers. In particular, multiple active lithium species are present in a copolymerization system and in the polymerization process each reactive species may possess different metallating strengths toward a polymer backbone. In addition, polymer chain propagation, metallation, and subsequent monomer addition occur concurrently. It is thus essential to isolate these events to investigate the metallation mechanism of a single reactive species.

In U.S. Pat. No. 5,562,310, a procedure was described to metallate the polymer chain and prepare grafted copolymers. In the disclosed method, it assumed that the additional n-BuLi was all consumed to metallate the terminated polymer backbone and additional monomer was all grafted on the polymer backbones resulting in chain branching. Using a similar approach, Kerns and Henning (see Kerns, M. L. and Henning, S. K., Presented at the Deutsche Kautschuk Tagung Meeting, September 2000) studied alkyllithium metallation with different counter-cations in butadiene polymerization in the presence of TMEDA and sodium mentholate. They concluded that the mechanism of metallation reactions involve a multi-component complex.

In the current study, a similar three-step approach as used by Kerns and Henning was adopted to investigate the metallation strength of different reactive species that are present in a continuous polymerization process. First, a SBR rubber cement (i.e., base polymer) with 25 weight percent styrene was prepared. The molecular weight of this base polymer was targeted around 250,000 to 300,000 g/mol. This molecular weight is high enough to ensure a clean separation of the polymer formed in subsequent reaction. Upon the completion of the reaction, a stoichiometric amount of ethanol was added into the reactor to terminate the living polymer chains. The second step was to metallate the terminated polymer chains by adding a pre-determined amount of co-modifiers and initiator with the ratios as described in Tables 1 and 2. This reaction lasted about 45 minutes. Finally, an additional monomer solution (same as that used in the first step) was charged into the reactor to propagate the polymerization. The freshly charged monomer was allowed to react until full conversion was achieved. The reaction was then terminated by injecting a small amount of ethanol and the final polymer was analyzed by SEC.

Figure 1:
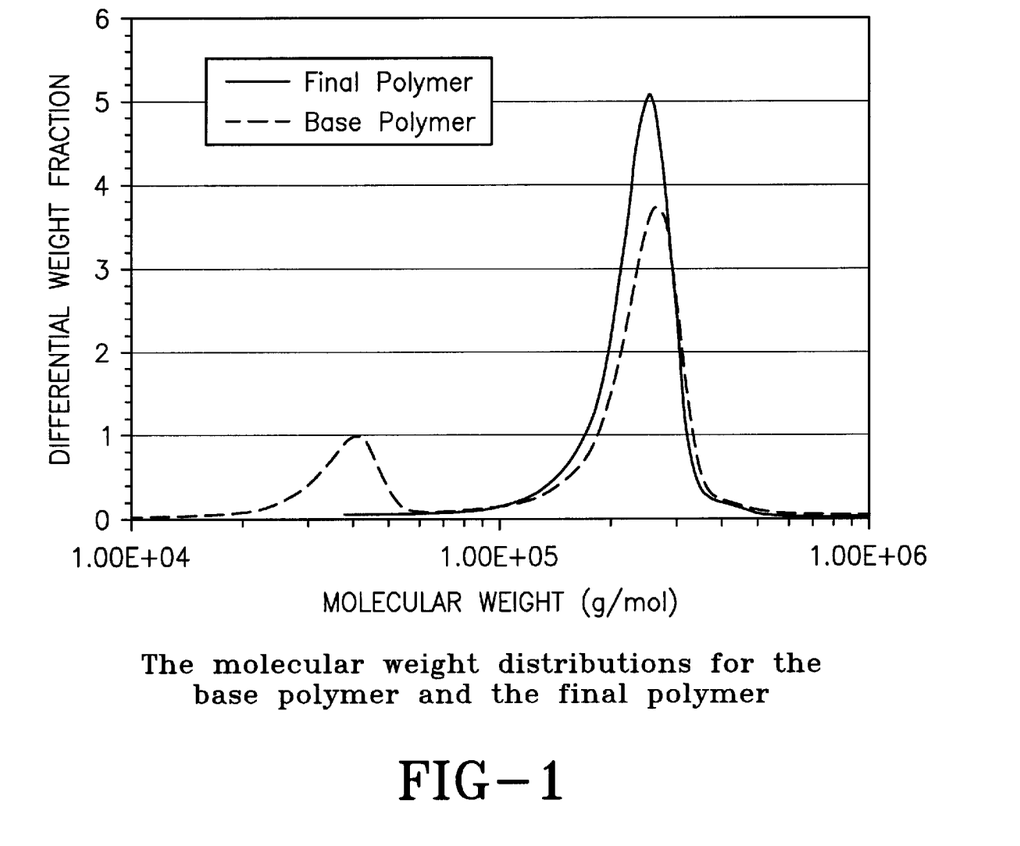
FIG. 1 is a plot of differential weight fraction versus molecular weight.

A typical SEC plot before and after the second monomer addition is shown in FIG. 1. The distribution with a single peak represents the base polymer made in the first step. Final polymer shows a bimodal distribution resulting from the mixture of polymers formed from the first step and the 3rd step. It is evident that a clean separation after the second monomer addition can be achieved.

The polymer chains formed after metallation were intentionally targeted at a lower molecular weight than base polymer formed in the first step so that a clean separation based upon elution time on SEC can be achieved. Thus, the amount of polymers associated with the different origins could be determined. That is, additional monomer added after the metallation step could be consumed only in two ways: one is to form new polymer chains with lower molecular weight than the base polymer, another is to be grafted onto the base polymer chains that were metallated.

The amount of polymer associated with these two different origins can be estimated based upon the areas under the peaks. By comparing with the amount of monomers charged into the reactor from these two different steps, the amount of monomer grafted onto the base polymer chains can be calculated. The metallation strength can be correlated the amount of additional monomer grafted onto the base polymers. If a larger amount of additional monomer was found to be grafted onto the base polymer, the initiator system exhibits stronger metallation power.

Figure 2A:
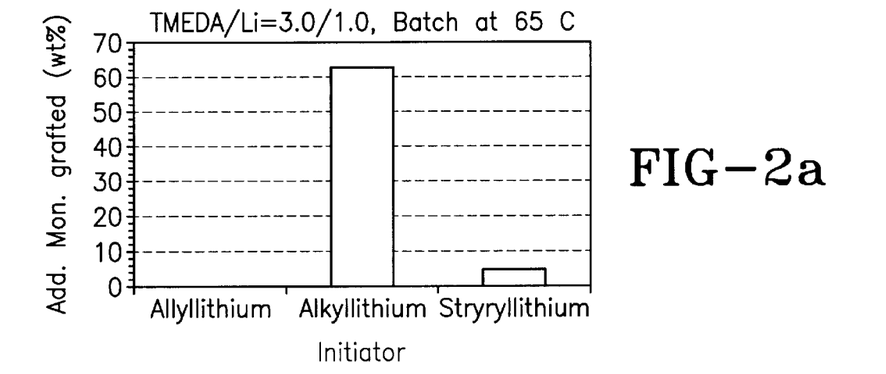
FIG. 2a is bar diagrams showing the weight percent of additional monomer grafted after the metallation step at a TMEDA/Li ratio of 3/1.
Figure 2B:
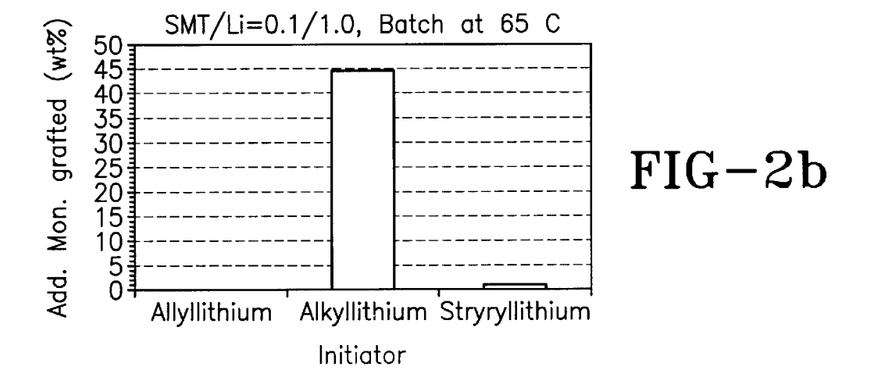
FIG. 2b is bar diagrams showing the weight percent of additional monomer grafted after the metallation step at a SMT/Li ratio of 0.1/1.
Figure 2C:
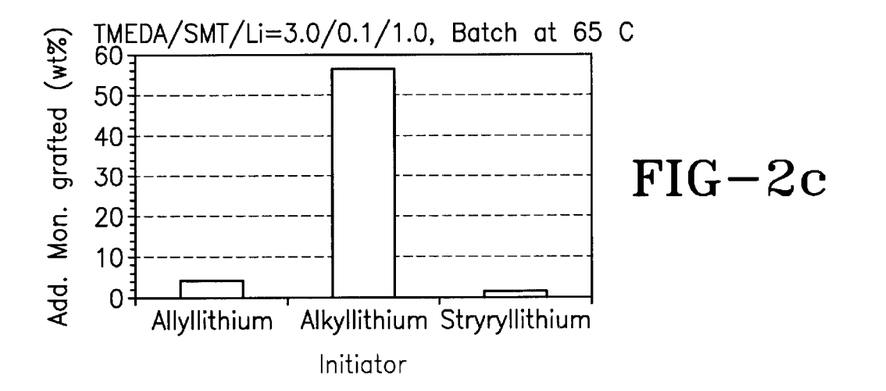
FIG. 2c is bar diagrams showing the weight percent of additional monomer grafted after the metallation step at a TMEDA/SMT/Li ratio of 3/0.1/1.

From the Table I and FIG. 2, it is observed that 1.) when allylic lithium and benzylic lithium initiators were used in the metallation step, the monomer added after metallation was mostly consumed in the formation of new polymer chains, no matter what the modifier combination; 2.) more than half of the additional monomer was grafted on the base polymer when n-BuLi was used in the metallation step; and 3) the metallation strength of the initiator system is greatly enhanced even with small amounts of sodium mentholate are present in the process (A-2).

TABLE I

BATCH METALLATION EXPERIMENTS

| | | 1st addition | | Post 2nd addition | | | New polymer | | | | |
|---|---|---|---|---|---|---|---|---|---|---|---|
| | | Base Polymer | | Base Polymer | | | | | | Theor. | |
| Expt | 2nd addition Ratio | Mw (kg/mol) 3rd | Mw/Mn 4th | Mw (kg/mol) 5th | Mw/Mn 6th | Amt (wt %) 7th | Mw (kg/mol) 8th | Mw/Mn 9th | Amt (wt %) 10th | amt (wt %) 11th | Grafted *(wt %) 12th |
| 2nd addition initiator system: TMEDA/SMT/n-BuLi | | | | | | | | | | | |
| A-1 | 3.0/0.0/1.0 | 221.8 | 1.06 | 293.6 | 1.11 | 92.1 | 70.25 | 1.31 | 7.9 | 21.31 | 62.9 |
| A-2 | 0.0/0.1/1.0 | 244.8 | 1.05 | 275.1 | 1.12 | 88.7 | 67.12 | 1.28 | 11.4 | 20.32 | 44.1 |
| A-3 | 3.0/0.1/1.0 | 241.5 | 1.05 | 292.1 | 1.16 | 91.2 | 62.39 | 1.38 | 8.8 | 20.32 | 56.6 |
| 2nd addition initiator system: TMEDA/SMT/Allylic lithium | | | | | | | | | | | |
| B-1 | 3.0/0.0/1.0 | 244.8 | 1.05 | 257.2 | 1.05 | 90.4 | 34.33 | 1.38 | 9.65 | 9.43 | −2.3 |
| B-2 | 0.0/0.1/1.0 | 232.0 | 1.05 | 235.3 | 1.05 | 71.9 | 21.95 | 1.23 | 28.1 | 26.5 | −6.1 |
| B-3 | 3.0/0.1/1.0 | 309.0 | 1.07 | 314.8 | 1.12 | 91.0 | 65.2 | 1.01 | 8.97 | 9.35 | 4.0 |
| 2nd addition initiator system: TMEDA/SMT/Styryllithium | | | | | | | | | | | |
| C-1 | 3.0/0.0/1.0 | 345.3 | 1.02 | 343.7 | 1.06 | 77.6 | 37.45 | 1.28 | 22.4 | 23.45 | 4.5 |
| C-2 | 0.0/0.1/1.0 | 244.5 | 1.06 | 250.3 | 1.06 | 79.2 | 25.87 | 1.15 | 20.8 | 20.94 | 0.7 |
| C-3 | 3.0/0.1/1.0 | 239.6 | 1.05 | 234.4 | 1.1 | 79.3 | 28.0 | 1.30 | 20.7 | 21.0 | 1.4 |

*the amount of monomer that was grafted onto the base polymers based upon the additional monomer charged into the reactor after metallation C. Metallation Strength of Alkyllithium, Allylic Lithium and Benzylic Lithium Using the aforementioned metallation method, a set of experiments was designed to study the metallation strength of n-BuLi, butadienyllithium, and styryllithium under the mixed modifier system consisting of TMEDA and sodium mentholate. The results were summarized in Table I. Base polymer molecular weight and its polydispersity (1st addition) are listed in the 3rd and 4th columns (labeled in the table under the column headings). After the second monomer addition, the molecular weight and its distribution of base polymer were changed due to the monomer grafted onto the backbone and their values are listed in the 5th and 6th columns. Any newly formed polymer had much lower molecular weight than the base polymer and its Mw and polydispersity are given in the 8th and 9th columns. The 7th and 10th columns give the estimated weight percentage of the polymers from the molecular weight distribution curves corresponding to the base polymer and newly formed polymer, respectively. The theoretical weight fraction of new polymer was calculated based upon the amount of monomer charged into the reactor and was listed in the 11th column. This value is calculated assuming no metallation occurred. The amount of monomer charged into the reactor after the metallation step that was then attached onto the base polymer chains was calculated and listed in the last column(12th).

To highlight the difference of metallation strength associated with the three initiators, the data in the last column in Table I was re-grouped to reflect the different initiator systems in the metallation step and was plotted in FIG. 2.

Earlier studies (see Falk, J. C.; Schlott, R. J.; Hoeg, D. F.; Pendleton, J. F. Rubber Chem. Tecnol., 1973, 46, 1044; and Tate, D. P.; Halasa, A. F.; Webb, F. J.; Koch, R. W.; Oberster, A. E. J. Polym. Sci.:Part A-1, 1971, 9, 139) demonstrated that the TMEDA/n-BuLi system would metallate diene-based polymers. However, a recent study by Kerns and Henning[13] did not find that significant metallation occurred in their system, albeit under different conditions. The current study (A-1) showed that substantial metallation did occur in this system with over 60 wt % of the additional monomer being grafted onto the base polymer chains. Based upon these findings, it is concluded that the metallation strength would follow the order of alkyllithium being stronger than allylic lithium with is equivalent to benzylic lithium.

Although little metallation was found when allylic lithium and benzylic lithium were used in the current study, our unpublished plant trial data show that branching increases from the first reactor to the second reactor when the modifier combination of TMEDA/SMT is used. This seems to be in contradiction to the concept and the above finding that metallation only occurs when alkyllithium is present in the reactor. It is believed that there is no or very little free alkyllithium presence after the first reactor in a continuous process due to the rapid initiation in a highly modified system. To resolve this, we investigated the effect of temperature on the extent of metallation using allylic lithium as an initiator. The results are summarized in Table II under the same column format as explained for Table I. The data in the last column in Table II was plotted in FIG. 3.

TABLE II

TEMPERATURE EFFECT ON BATCH METALLATION

| | | 1st addition | | | | | Post 2nd addition New polymer | | | | |
|---|---|---|---|---|---|---|---|---|---|---|---|
| | | Base Polymer | | Base Polymer | | | | | | Theo. | |
| Expt | Metallation Temp (° C.) | Mw (kg/mol) | Mw/Mn | Mw (kg/mol) | Mw/Mn | Amt (wt %) | Mw (kg/mol) | Mw/Mn | Amt (wt %) | amt (wt %) | Grafted *(wt %) |
| 2nd addition initiator system: TMEDA/SMT/allylic lithium = 3.0/0.1/1.0 | | | | | | | | | | | |
| B-3 | 65 | 309.0 | 1.07 | 314.8 | 1.12 | 91.03 | 65.2 | 1.01 | 8.97 | 9.35 | 4.0 |
| D-2 | 72 | 260.0 | 1.04 | 263.2 | 1.12 | 80.2 | 33.49 | 1.34 | 19.8 | 22.62 | 12.5 |
| D-3 | 78 | 279.0 | 1.06 | 286.8 | 1.30 | 83.0 | 39.69 | 1.25 | 17.0 | 23.56 | 27.8 |

*the amount of monomers was grafted onto the base polymers based upon the additional monomer charged into the reactor after metallation.

Figure 3:
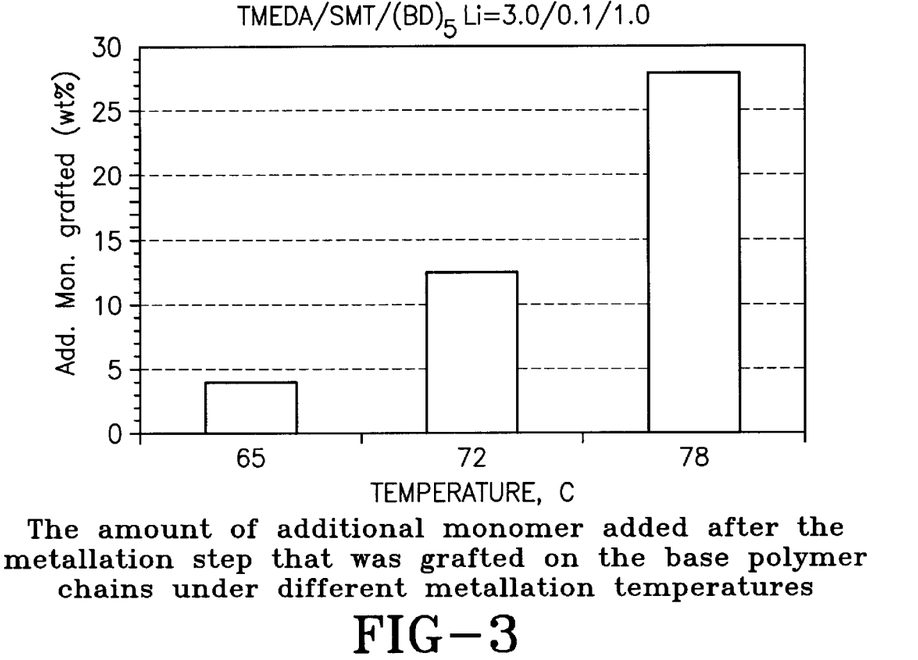
FIG. 3 is a bar diagram showing the weight percent of additional monomer grafted at temperatures of 65° C., 72° C., and 78° C.

It is clear that the extent of metallation increases with the reaction temperature and the amount of monomer grafted onto the base polymer monotonically increases. It is therefore not surprising that the degree of branching will be higher after the first reactor in a continuous process if higher temperatures are employed in the later reactors.

D. Practical Examples

To confirm the above finding, two continuous experiments were designed to prepare high vinyl SBRs using mixed modifiers of TMEDA and SMT (Table III). The continuous process contains two reactors. In Experiment 1, initiator n-BuLi was directly fed into the first reactor. Reactor temperatures in both reactors were kept at 85° C. As seen in subsection C, alkyllithium exhibits a much stronger metallation tendency than allylic lithium or styryllithium. In Experiment 2, to eliminate the possible existence of n-BuLi in the reactor, a preformed allylic lithium was prepared when n-BuLi (chain extended n-BuLi with butadiene) was pre-reacted with 10 butadiene units and the resulting oligomer was then fed into the reactor. Reactor temperatures in both reactors were maintained at 75° C. to minimize metallation and branching reactions. The characterization data of the polymers synthesized in these two experiments are summarized in Table III.

TABLE III

CHARACTERIZATION OF CONTINUOUS POLYMERS

| Sample Type | Polymer a | Polymer b |
|---|---|---|
| Method to Feed initiator | Pre-formed | Direct |
| Mooney (OE), 37.5 phr Gerstine Oil, $ML_{1+4}$, 100° C. | 52.7 | 53.0 |
| Molecular Weight distribution | | |
| Mn, g/mol | 380,100 | 465,000 |
| Mw, g/mol | 545,300 | 809,100 |
| Polydispersity | 1.44 | 1.74 |
| Radius Gyration | | |
| Rn, nm | 40.3 | 45.4 |
| Rw, nm | 45.9 | 53.2 |
| Branching level | | |
| Rw/Mw, nm-mol/kg | 0.0842 | 0.0658 |

TABLE III-continued

CHARACTERIZATION OF CONTINUOUS POLYMERS

| Sample Type | Polymer a | Polymer b |
|---|---|---|
| M-DSC | | |
| Tg (onset, OE), ° C. | −28.8 | −21.4 |

As described in the paper of Kerns and Henning, Size Exclusion Chromatography (SEC) with Multi Angle Laser Light Scattering (MALLS) can be used to determine the relative level of branching by comparing the radius of gyration at a given molar mass. Since branched polymer exhibits a smaller coil size compared to its linear counterpart, the radius gyration will be smaller at a given molecular weight (see Bauer, B. J.; Fetters, L. J., *Rubber Chemistry and Technology*, 1978, 51, 406).

Figure 4:
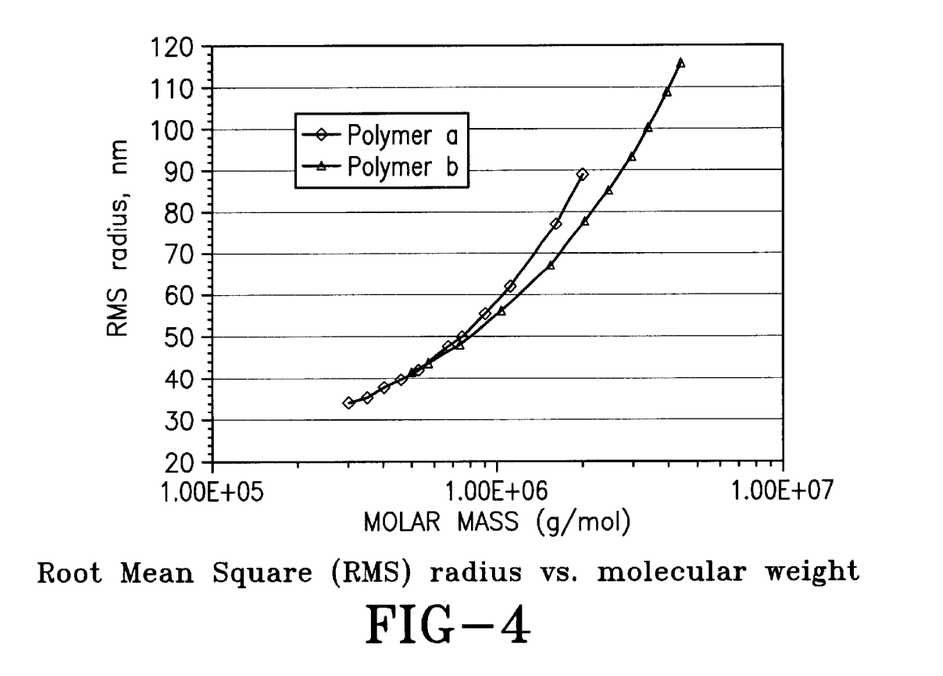
FIG. 4 is a plot of RMS radius versus molar mass.

FIG. 4 shows the root mean square radius as a function of molar mass for the high vinyl SBR samples. It is seen that both samples give a similar radius at low molar masses. At higher weights, polymer b with n-BuLi being directly fed into the reactor has a much smaller radius at high molecular weights, indicating a relatively higher branching level in the polymer.

It is known that linear and branched polymers show different linear viscoelastic response under simple oscillatory shear flow. Branched polymers typically exhibit higher Newtonian viscosity at low shear rates due to their increased relaxation time and entanglements caused by the branching points. Dynamic testing with a constant stress parallel plate rheometer has been demonstrated to adequately characterize the low shear rate behavior of polymers by extending the test to low angular frequencies so that it allows the polymer sample to reach the plateau and terminal zone behavior (see Bauer, B. J.; Fetters, L. J., *Rubber Chemistry and Technology*, 1978, 51, 406).

Figure 5:
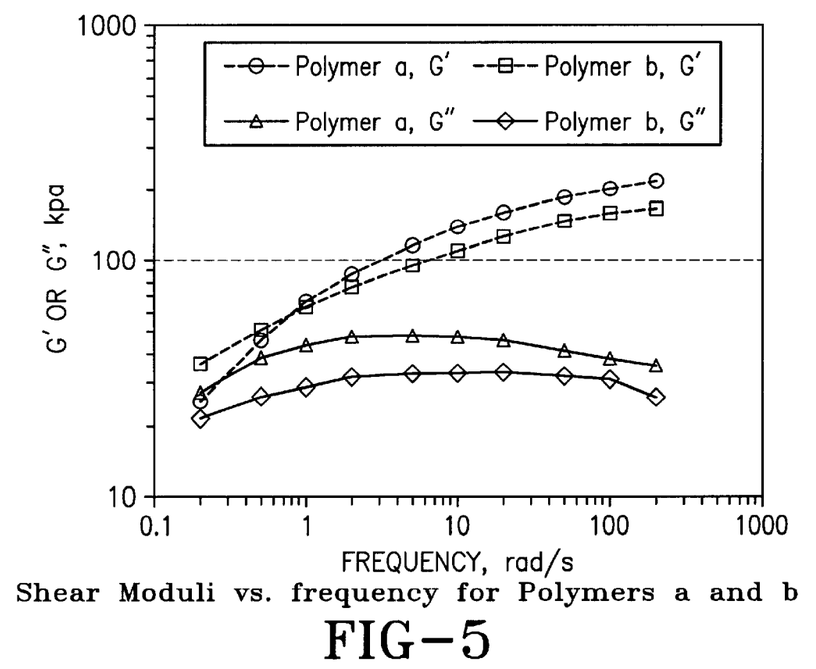
FIG. 5 is a plot of G' or G" versus frequency.

Branched polymers normally show higher G' values at low angular frequencies because their increased physical entanglements confine the movement of polymer chains and the external deformation can be transferred into the elastic component of moduli. It was also found that the crossover frequency of elastic and loss shear modulus (G" overtakes G') correlates well with the level of branching given the same microstructure and molecular weight. FIG. 5 shows G' and G" behavior of both samples as a function of frequency. It is observed that there is crossover for polymer a at the frequency of 0.3 rad/sec while no crossover occurred for polymer b in the frequency range in which the measurement was conducted. This implies that there are indeed more branching points along the backbone of polymer b than there are in polymer a, even though both polymers exhibit similar mooney viscosities.

Figure 6:
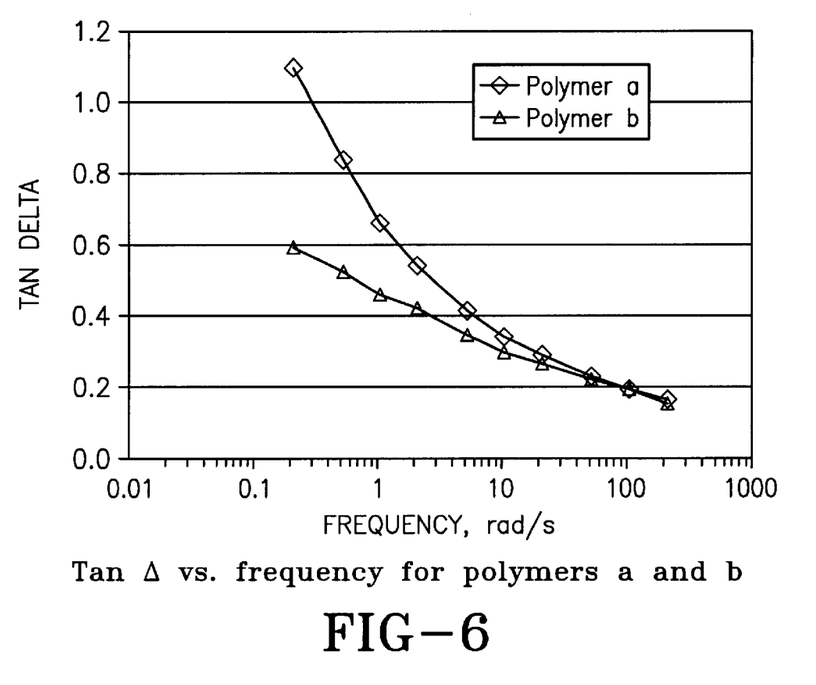
FIG. 6 is a plot of tan delta versus frequency.

An alternative way to reflect the relative branching level is the dependency of tan delta (G"/G') on frequency. The lower the value of tan delta, the more branched polymer will be. FIG. 6 shows that the polymer a has much higher values of tan delta than that of polymer b. Moreover, polymer a exhibits crossover (tan □=1.0), while polymer b does not. All of these means that polymer a have more linear macro-structure than polymer b. This is consistent with the analysis and results from the aforementioned metallation study.

E. Compound Properties A standard silica formation with 86 phr Rhodia Zeosil 1165 was used with BR/sSBR at a 30/70 phr ratio. The BR used in the formulation was Budene® 1207 high cis-polybutadiene rubber. The primary interest of this study is to demonstrate the benefit of in-situ initiator technology. The data from the compounding evaluation is summarized in Table IV. As aforementioned, the pre-formed initiator technology will reduce the extent of metallation in our initiator system and thus leads to more linear polymer. When this polymer is used in a tread compound formulation, it is expected to improve the hysteretic properties. It is evident from Table IV that the hot rebound is higher for polymer a and Metravib tan delta value at 50° C. is much lower than that of polymer b, even though polymer b has a slightly higher mooney viscosity.

TABLE IV

HYSTERETIC ANALYSIS OF HIGH VINYL SBRs

| Sample Type | Polymer a | Polymer b |
|---|---|---|
| Compounded Money | 42.8 | 40.1 |
| Shore A | 64.8 | 66.9 |
| Goodyear-Healey Rebound | | |
| Cold Rebound (%) | 8.6 | 8.8 |
| Hot Rebound (%) | 59.8 | 56.8 |
| Metravib | | |
| Tan d (50° C., 6%) | 0.2079 | 0.2679 |
| Tan d (−10° C., 1.5%) | 0.838 | 0.819 |

A Metallation study using different initiators combined with mixed modifier of TMEDA and sodium mentholate has been conducted in batch experiments. It is concluded that the metallation strength for different initiators follows the order of alkyllithium being greater than allylic lithium which is equivalent to styryllithium. Reaction temperature was also investigated with the selection of allylic lithium and the combination of TMEDA and sodium mentholate as the modifier system. It was found that the metallation strength increases significantly with the temperature.

The results from the batch experiments were used to guide the design of an initiator feed system in a continuous process to minimize the metallation tendency inherent to the highly modified reaction system that is necessary to produce polymer materials with high vinyl content and high glass transition. The compounding evaluation demonstrated that the pre-formed/in-situ initiator technology does lead to lower branching level in the polymer sample and thus the hysteretic properties in a silica formulation were significantly improved.

Variations in the present invention are possible in light of the description of it provided herein. It is, therefore, to be understood that changes can be made in the particular embodiments described which will be within the full intended scope of the invention as defined by the following appended claims.

What is claimed is:

1. A process for preparing a rubbery polymer having a high vinyl content which comprises:

polymerizing at least one diene monomer with a lithium initiator selected from the group consisting of allylic lithium compounds and benzylic lithium compounds at a temperature which is within the range of about 5° C. to about 120° C. in the presence of a Group I metal alkoxide and a polar modifier, wherein the molar ratio of the Group I metal alkoxide to the polar modifier is within the range of about 0.1:1 to about 10:1; and wherein the molar ratio of the Group I metal alkoxide to the lithium initiator is within the range of about 0.05:1 to about 10:1.

2. An initiator system which is comprised of (a) a lithium initiator selected from the group consisting of allylic lithium compounds and benzylic lithium compounds, (b) a Group I metal alkoxide, and (c) a polar modifier; wherein the molar ratio of the Group I metal alkoxide to the polar modifier is within the range of about 0.1:1 to about 10:1; and wherein the molar ratio of the Group I metal alkoxide to the lithium initiator is within the range of about 0.01:1 to about 20:1.

3. A process for preparing high vinyl polydiene rubber which comprises: polymerizing 1,3-butadiene monomer with a lithium initiator selected from the group consisting of allylic lithium compounds and benzylic lithium compounds at a temperature which is within the range of about 5° C. to about 120° C. in the presence of Group I metal alkoxide and a polar modifier, wherein the molar ratio of the Group I metal alkoxide to the polar modifier is within the range of about 0.1:1 to about 10:1; and wherein the molar ratio of the Group I metal alkoxide to the lithium initiator is within the range of about 0.05:1 to about 10:1.

4. A high vinyl polydiene rubber which is comprised of at least 50 percent repeat units that are of vinyl microstructure based upon the total number of polydiene repeat units in the rubbery polymer, wherein said high vinyl polydiene rubber has a weight average molecular weight of at least 300,000, wherein said high vinyl polybutadiene rubber has a mono-modal polydispersity of at least 1.2, and a ratio of radius of gyration to weight average molecular weight of greater than 0.078 nm·mol/kg, wherein the radius of gyration is determined at the weight average molecular weight by multi angle laser light scattering and wherein the weight average molecular weight is determined by multi angle laser light scattering.

5. An initiator system as specified in claim 2 wherein the Group I metal alkoxide is a Group I metal salt of a cyclic alcohol.

6. An initiator system as specified in claim 5 wherein the Group I metal is selected from the group consisting of lithium, sodium, potassium, rubidium, and cesium.

7. An initiator system as specified in claim 6 wherein the Group I metal salt of the cyclic alcohol is a metal salt of a di-alkylated cyclohexanol.

8. An initiator system as specified in claim 6 wherein the Group I metal salt of the cyclic alcohol is a metal salt of a disubstituted cyclohexanol.

9. An initiator system as specified in claim 2 wherein the metal salt of the cyclic alcohol is sodium mentholate.

10. An initiator system as specified in claim 5 wherein the molar ratio of the metal salt of the cyclic alcohol to the polar modifier is within the range of about 0.2:1 to about 5:1; and wherein the molar ratio of the metal salt of the cyclic alcohol to the lithium initiator is within the range of about 0.05:1 to about 10:1.

11. An initiator system as specified in claim 5 wherein the molar ratio of the metal salt of the cyclic alcohol to the polar modifier is within the range of about 0.5:1 to about 1:1; and wherein the molar ratio of the metal salt of the cyclic alcohol to the lithium initiator is within the range of about 0.2:1 to about 3:1.

12. An initiator system as specified in claim 2 wherein the lithium initiator is an allylic lithium compound.

13. An initiator system as specified in claim 2 wherein the lithium initiator is a benzylic lithium compound.

14. An initiator system as specified in claim 2 wherein said initiator system is void of alkyl lithium compounds.

15. A process as specified in claim 2 wherein said polar modifier is selected from the group consisting of diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine, and alkyltetrahydrofurfuryl ethers.

16. A process as specified in claim 1 wherein the molar ratio of the Group I metal alkoxide to the polar modifier is within the range of about 0.2:1 to about 5:1; and wherein the molar ratio of the Group I metal alkoxide to the lithium initiator is within the range of about 0.05:1 to about 10:1.

17. A process as specified in claim 16 wherein the polymerization is conducted at a temperature which is within the range of about 5° C. to about 120° C.

18. A process as specified in claim 17 wherein the Group I metal alkoxide is a sodium salt of a cyclic alcohol.

19. A process as specified in claim 17 wherein the Group I metal alkoxide is sodium mentholate.

20. A process as specified in claim 18 wherein the molar ratio of the metal salt of the cyclic alcohol to the polar modifier is within the range of about 0.5:1 to about 1:1; and wherein the molar ratio of the metal salt of the cyclic alcohol to the lithium initiator is within the range of about 0.2:1 to about 3:1.

21. A process as specified in claim 20 wherein said polar modifier is N,N,N',N'-tetramethylethylenediamine.

22. A process as specified in claim 18 wherein the polymerization is conducted at a temperature which is within the range of about 20° C. to about 80° C.

23. A process as specified in claim 18 wherein the polymerization is conducted at a temperature which is within the range of about 40° C. to about 70° C.

24. A process as specified in claim 1 wherein the lithium initiator is an allylic lithium compound.

25. A process as specified in claim 1 wherein the lithium initiator is a benzylic lithium compound.

26. A process as specified in claim 24 wherein said lithium initiator is void of alkyl lithium compounds.

27. A high vinyl polydiene rubber as specified in claim 4 wherein the ratio of the radius of gyration to weight average molecular weight of the high vinyl polydiene rubber is greater than 0.08 nm·mol/kg.

28. A high vinyl polydiene rubber as specified in claim 27 wherein the monomodal polydispersity of the high vinyl polydiene rubber is at least 1.3.

29. A high vinyl polydiene rubber as specified in claim 28 wherein the high vinyl polydiene rubber has a weight average molecular weight that is within the range of about 400,000 to about 1,000,000.

30. A high vinyl polydiene rubber as specified in claim 29 wherein the high vinyl polydiene rubber has a vinyl content of at least 55 percent.

31. A high vinyl polydiene rubber as specified in claim 30 wherein the ratio of the radius of gyration to weight average molecular weight of the high vinyl polydiene rubber is greater than 0.082 nm·mol/kg.

32. A high vinyl polydiene rubber as specified in claim 31 wherein the monomodal polydispersity of the high vinyl polydiene rubber is at least 1.4.

33. A high vinyl polydiene rubber as specified in claim 28 wherein the high vinyl polydiene rubber has a weight average molecular weight that is within the range of about 350,000 to about 2,000,000.

34. A high vinyl polydiene rubber as specified in claim 30 wherein the polydiene repeat units in the high vinyl polydiene rubber are derived from 1,3-butadiene and wherein the high vinyl polydiene rubber is high vinyl polybutadiene rubber.

35. A high vinyl polydiene rubber as specified in claim 30 wherein the polydiene repeat units in the high vinyl polydiene rubber are derived from isoprene and wherein the high vinyl polydiene rubber is 3,4-polyisoprene rubber.

36. A high vinyl polydiene rubber as specified in claim 34 wherein the repeat units in the high vinyl rubber are further derived from a vinyl aromatic monomer.

37. A high vinyl polydiene rubber as specified in claim 36 wherein the vinyl aromatic monomer is styrene and wherein the high vinyl polydiene rubber is styrene-butadiene rubber.

38. A rubber compound that is comprised of the high vinyl polydiene rubber specified in claim 4 and a filler selected from the group consisting of carbon black and silica.

39. A high vinyl polydiene rubber as specified in claim 4 wherein said high vinyl polydiene rubber is made by a continuous polymerization process.

* * * * *

UNITED STATES PATENT AND TRADEMARK OFFICE
CERTIFICATE OF CORRECTION

PATENT NO. : 6,566,478 B1  
DATED : May 20, 2003  
INVENTOR(S) : Steven Kristofer Henning, Michael Lester Kerns and Zhengfang Xu It is certified that error appears in the above-identified patent and that said Letters Patent is hereby corrected as shown below:

<u>Column 5,</u>
Lines 21 and 23, delete "polybutadiene" and insert -- polydiene --.

<u>Column 21,</u>
Line 10, delete "(tan $_\square$=1.0)" and insert -- (tan $\Delta$=1.0) --.

<u>Column 22,</u>
Line 40, delete "polybutadiene" and insert -- polydiene --.

Signed and Sealed this

Twenty-first Day of March, 2006

JON W. DUDAS  
*Director of the United States Patent and Trademark Office*